Patented Feb. 23, 1943

2,311,750

UNITED STATES PATENT OFFICE 2,311,750

WELDING ELECTRODE

Franz R. Hensel and Earl I. Larsen, Indianapolis, Ind., assignors to P. R. Mallory & Co., Inc., Indianapolis, Ind., a corporation of Delaware No Drawing. Application October 17, 1941, Serial No. 415,449

6 Claims. (Cl. 219—4)

This invention relates to welding electrodes and more particularly to pressure exerting welding electrodes.

An object of the invention is to produce an improved pressure exerting welding electrode.

Other objects of the invention will be apparent from the following description taken in connection with the appended claims.

The present invention comprises the combination of elements, methods of manufacture and the product thereof, brought out and exemplified in the disclosure hereinafter set forth, the scope of the invention being indicated in the appended claims.

While a preferred embodiment of the invention is described herein, it is contemplated that considerable variation may be made in the method of procedure and the combination of elements, without departing from the spirit of the invention.

In the resistance welding of metal parts, the usual procedure is to pass an electrical current through the parts to produce a local heating effect which results in the welding of the parts together. The current and pressure are usually supplied by welding electrodes which are firmly pressed against the parts to be welded and which conduct the electric current to the welding area. Briefly, this is the procedure followed in all forms of resistance welding, such as spot welding, seam welding, projection welding and the like.

Since it is the function of the welding electrodes to conduct electricity from one piece to another, the following factors are of importance:

(a) The specific resistance of the welding electrode which is usually a function of the chemical composition of the die material. It may also be a function of the cold working and of the heat treatment which is given to the electrodes.

(b) The change of the specific resistance during operation, due to thermal gradients established in such electrodes.

(c) The contact resistance of the welding electrode and the change of contact resistance during operation.

It is very essential that the electrodes do not deteriorate in operation. With many commercial electrode materials it is found that the electrodes will change their shape, their physical properties, their electrical characteristics and possibly also their chemical characteristics.

While it is impossible to eliminate entirely such changes, it is possible to decrease the rate of change and therewith obtain an increase in life over previous electrode materials. The causes for the deterioration of the electrodes are usually due to thermal, mechanical, electrical and chemical influences. The thermal gradients set up in welding electrodes are the prime cause for deterioration. The heating of the electrodes may be due to several causes, such as heating by the current passing through the electrode material.

This is a function primarily of the specific resistance of the electrode material. Furthermore, heat is generated, due to the resistance between electrode and work. This heat depends on the pressure used; also on such factors as surface conditions of the material to be welded and the type of electrode. In addition to the above, there exists also conduction of heat by the electrode. This is proportional to the electrode tip area, multiplied by the temperature difference between the electrode temperature and the temperature where the electrode touches the work. It is also proportional to the length of time the electrodes are in contact with the work.

In a number of tests carried out by the inventors, it was found that in solid tips without water cooling, temperatures of 300 to 400° C. may be reached just below the welding surface. At such temperatures the electrical conductivity will be decreased to a value approximately 50% that of the conductivity at room temperature. Furthermore, at such elevated temperatures the mechanical properties particularly of copper alloys, are affected very materially. This is particularly true in cold worked alloys, such as cold worked copper. The electrodes under the influence of pressure and heat, tend to flow plastically because the yield strength of the material is exceeded. During continuous welding the heat created near the welding surface will cause complete annealing of the electrodes and thereby produce a material in the dead soft condition. This material has not the ability to withstand any substantial pressures used in resistance welding. This is particularly true in the modern process of welding, where total pressures of 2,000 to 3,000 lbs. may be exceeded.

The present invention contemplates an improved copper alloy, hardened with a small percentage of columbium. The columbium additions which have been found useful in the manufacture of resistance welding electrodes, range from .05 to 3%. Such welding electrodes are suitable for pressure welding operations, such as spot welding, seam welding, projection welding, electric riveting and similar variations of resistance welding methods. The softening temperature of cold rolled copper is raised from 200 to 250° C., to 400 to 500° C. by the addition of columbium. For example, 0.5% of columbium raises the softening temperature of cold rolled copper to 450° C. Noticeable improvements in raising the softening temperature are produced by the addition of smaller percentages of columbium to pure copper. By using a pure grade of columbium a very high electrical conductivity can be retained and will range from 50 to 90% of International annealed copper standard according to the amount of columbium used and the purity of columbium.

There are many applications in resistance welding where the strength of cold worked copper is satisfactory and where it is necessary only to raise the annealing temperature. In such applications, the present invention contemplates the use of a binary copper-columbium alloy, or a ternary copper-columbium-silver alloy, wherein the silver content may range from .02 to 10%. As described in F. R. Hensel Patent #2,073,371, the use of small amounts of silver in copper electrodes greatly increase their softening temperature. We have now found that columbium is even more effective in this respect and that by combining both the effects of silver and columbium, extremely valuable electrode die materials for resistance welding may be produced.

We have found that there are some applications in which a still higher hardness and other improved physical properties, are desirable. In order to obtain such materials we contemplate adding age-hardening ingredients to the copper-columbium compositions. For example, 0.1 to 3% of age-hardening metals such as chromium, zirconium and beryllium may be added either singly or jointly. In addition to these elements, we have also found that age-hardening intermetallic compounds may be used to further harden electrodes of copper and columbium. Such alloys may use as hardening ingredients 0.25 to 5% of compounds consisting of elements taken from the group of nickel, cobalt, iron and chromium, on the one hand, with elements from the group beryllium, silicon, phosphorus, aluminum, titanium and zirconium, on the other hand.

It has been found that the elements belonging to the columbium group, namely, vanadium and tantalum, may be present in the new alloys in small percentages. Since the affinity of vanadium and tantalum for copper is very low there occurs only a slight alloying action. We have found that in the case of vanadium, a definite susceptibility to heat treatment exists. However, the improvements obtained by the heat treatment, consisting in quenching and aging operations, are found only in the electrical characteristics and particularly in the electrical conductivity which is greatly improved by aging. The other physical properties are not materially affected, except the annealing temperature.

In some cases 0.1 to 3% cadmium may likewise be present either in the binary copper-columbium alloys or in the age-hardened alloys. The cadmium further increases the hardness and heat resistance and reduces the tendency to sticking.

If it is desired to make the electrode alloys free-cutting a small percentage of tellurium may be added.

While the present invention as to its objects and advantages, has been described herein as carried out in specific embodiments thereof, it is not desired to be limited thereby but it is intended to cover the invention broadly within the spirit and scope of the appended claims.

What is claimed is:

1. A welding electrode composed of a copper base alloy containing 0.05 to 3% columbium and at least about 90% copper, said electrode being characterized by higher hardness than cold rolled copper and a softening temperature above 400° C.

2. A welding electrode containing 0.05 to 3% columbium, balance substantially all copper.

3. A welding electrode composed of an age-hardened copper base alloy containing 0.05 to 3% columbium, a precipitation hardening ingredient in proportions sufficient to effect age-hardening of the copper base and the balance substantially all copper.

4. A welding electrode composed of an age-hardened copper base alloy containing 0.05 to 3% columbium, a precipitation hardening ingredient, selected from the group consisting of the metals chromium, zirconium, beryllium, and the intermetallic compounds of nickel, cobalt, iron or chromium with beryllium, silicon, phosphorus, aluminum, titanium or zirconium in proportions sufficient to effect age-hardening of the copper base but not greater than a few percent, and the balance substantially all copper.

5. A welding electrode containing 0.05 to 3% columbium, 0.1 to 3% chromium, balance substantially all copper.

6. A welding electrode containing 0.05 to 3% columbium, 0.02 to 10% silver and the balance substantially all copper.

FRANZ R. HENSEL.
EARL I. LARSEN